(12) United States Patent
Chandrasekaran et al.

(10) Patent No.: US 11,886,561 B2
(45) Date of Patent: Jan. 30, 2024

(54) METHOD AND APPARATUS USING BLENDED BIOMETRIC DATA

(71) Applicant: Wisconsin Alumni Research Foundation, Madison, WI (US)

(72) Inventors: Varun Chandrasekaran, Madison, WI (US); Rahul Chatterjee, Madison, WI (US); Xiaohan Fu, San Diego, CA (US); Jin-Yi Cai, Madison, WI (US); Suman Banerjee, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 374 days.

(21) Appl. No.: 17/177,080

(22) Filed: Feb. 16, 2021

(65) Prior Publication Data
US 2022/0261463 A1   Aug. 18, 2022

(51) Int. Cl.
*G06F 21/32* (2013.01)
*G06N 20/00* (2019.01)
*G06F 21/40* (2013.01)
*G06V 40/70* (2022.01)

(52) U.S. Cl.
CPC ............ *G06F 21/32* (2013.01); *G06F 21/40* (2013.01); *G06N 20/00* (2019.01); *G06V 40/70* (2022.01)

(58) Field of Classification Search
CPC ......... G06F 21/32; G06F 21/40; G06N 20/00; G06V 40/70
See application file for complete search history.

(56) References Cited

U.S. PATENT DOCUMENTS

| | | | |
|---|---|---|---|
| 2016/0269178 A1* | 9/2016 | Yang | H04L 63/0861 |
| 2018/0012006 A1* | 1/2018 | Suh | G06F 21/32 |
| 2019/0354787 A1* | 11/2019 | Fong | G06V 10/454 |
| 2020/0044852 A1* | 2/2020 | Streit | H04L 9/3231 |
| 2020/0153624 A1* | 5/2020 | Wentz | G06F 21/32 |
| 2020/0402052 A1* | 12/2020 | Sloane | H04L 63/105 |
| 2021/0034729 A1* | 2/2021 | Chung | G06F 21/32 |

OTHER PUBLICATIONS

Dodis et al.; Fuzzy Extractors. How to Generate Strong Keys from Biometrics and Other Noisy, a preliminary version of this work appeared in Eurocrypt 2004 [DRS04]. This version appears in Siam Journal on Computing, 38(1):97-139, p. 1-46; 2008.

* cited by examiner

*Primary Examiner* — Bassam A Noaman
(74) *Attorney, Agent, or Firm* — Boyle Fredrickson, SC (57) ABSTRACT

A biometric processing system for authentication combines multiple biometric signals using machine learning to map the different signals into a common argument space that may be processed by a similar fuzzy extractor. The different biometric signals may be given weight values related to their entropy allowing them to be blended to increase security and availability while minimizing intrusiveness.

10 Claims, 4 Drawing Sheets

METHOD AND APPARATUS USING BLENDED BIOMETRIC DATA

STATEMENT REGARDING FEDERALLY SPONSORED RESEARCH OR DEVELOPMENT

This invention was made with government support under 1629833 and 1714275 awarded by the National Science Foundation. The government has certain rights in the invention.

CROSS REFERENCE TO RELATED APPLICATION

Background of the Invention

The present invention relates to computer systems using biometric sensors (e.g., fingerprint sensors) to authenticate users and in particular to a computer system that may readily use multiple different biometric sensors for improved security and convenience.

Computer systems, and in particular those in mobile devices such as cellular telephones, are increasingly relied upon to secure personal information to prevent unauthorized access by others. Such security may be provided by requiring the user to enter an alphanumeric string password to "unlock" the device. In this process, the computer system compares the entered password to a key or reference value held in secure hardware and unlocks the computer system if there is a match. Unlocking generally allows access to memory locations (data and/or programs) previously not accessible when the computer system was in the locked state.

In order to prevent an unattended device that has previously been unlocked from being accessed by others, a timer may be set so that the computer system automatically locks itself again if the computer system is unused for a given period of time.

Passwords can be inconvenient and difficult for an authorized user to memorize and enter. For this reason, biometrics, such as those which measure the physical characteristics, may be used for security purposes. Such biometrics include anthropometric biometrics (such as scans of the fingerprint, face, or "iris") and behavioral biometrics (such as keystroke or gait analysis). The biometric data, like a password, can be compared to a key or reference value, and if there is a match, the device unlocked.

When the reference for a biometric signature is a template (for example, a representation of a fingerprint to which data from a fingerprint scanner is compared) the security can be compromised if the key value is revealed, for example, by the compromise of the device. For example, if a fingerprint template is used for the reference and is compromised, the template itself can be used to reconstruct a simulated fingerprint that can then be applied to the fingerprint sensor to unlock the device.

For this and other reasons, it is known to process the biometric data using "fuzzy extraction." Fuzzy extraction receives "commissioning" biometric data during a commissioning process to produce a "key" string and a "helper"" string. Later "authenticating" biometric data used for authentication may be received by the fuzzy extractor together with the appropriate helper string to reconstruct the key string if the authenticating biometric data is close to the commissioning biometric data. Importantly, the helper strings and key strings alone, cannot be used to learn any information about the original commissioning biometric data greatly reducing the risk in cases where the helper string or key string is somehow accessed and revealed. This is important because biometric data, unlike passwords, for example, cannot be easily changed if compromised. Fuzzy extractors transform the biometric data (typically compressing it) while preserving the clustering of varying data from a single individual.

Despite these advantages to fuzzy extraction, it can be difficult to construct fuzzy extractors for a wide variety of biometric data. This construction of fuzzy extractors is difficult because the fuzzy extraction must transform the data (typically compressing it) while preserving the clustering of varying data from a single individual.

Different types of biometric data have varying qualities of "entropy," "intrusiveness," and "availability" that affect their value for authenticating users. "Entropy" in this context generally relates the level of security offered by the biometric data. In a first approximation, entropy is a measure of the range of distinguishable values of the biometric data. Biometric data, for example, from fingerprint readers can have high "nominal" entropy (on the order of 2000 bits) compared to a typical user password of less than 50 bits. The practical entropy of a biometric sensor is typically less than its nominal entropy, degraded by processing of the signal data, for example, by fuzzy extraction and so-called "adversarial loss" assessing the degree to which the biometric measurements are amenable to attack. The risk of adversarial loss results in even high-entropy biometric sensors typically being used in conjunction with a password, the latter, for example, which must be entered by the user independent of the biometric sensing.

The "intrusiveness" of the biometric sensor is a measure of the burden placed on the computer system and/or user in collecting and processing the biometric data. Iris scans, facial scans, and fingerprint readers are relatively intrusive biometrics, requiring the user to interrupt his or her work to submit to a scan. In contrast, gait analysis or speech analysis can be relatively unintrusive, working in the background using few computer system resources. Intrusive biometric sensors, requiring conscious participation by the user, are considered to be "active" while biometric sensors that can operate without user awareness are considered "passive".

The "availability" of biometric sensing data is a measure of the delay that may be incurred in receiving that biometric data. Generally, many types of passive sensing may have a lower availability to the extent that an individual may not be walking or speaking at a given instant, as would be necessary for gait or speech analysis, respectively.

The level of security expected by computer users and the challenge of creating effective fuzzy extractors for biometric data may lead manufacturers to use a single, active biometric sensor of high entropy. Because such sensors are intrusive, there is an incentive to avoid re-authentication after an initial login such as may reduce the overall security of the device.

SUMMARY OF THE INVENTION

The present invention provides a mechanism for readily integrating multiple different biometric sensors and in particular for blending the values of biometric sensors including combining active, high-entropy sensors with passive, low-entropy sensors for improved security and reduced intrusiveness. In one embodiment, the invention may use a high-entropy active biometric sensor to move the device to an unlocked state and one or more low-entropy biometric sensors to passively sustain the device in the unlocked state. In one embodiment, high security for the multiple biometric sensor keys can be provided by using a single fuzzy extractor to process the biometric data from the different sensors by converting that different biometric data to a common form by machine-learning.

In one embodiment, the invention provides a secure computing system having a set of biometric sensors providing different biometric signals discriminating between different users of the computing system, the biometric signals providing different levels of entropy related to security. A first biometric signal having a relatively higher entropy, moves the computing system into an unlocked state from a locked state, the unlocked state allowing the access to memory regions of the computing system not accessible in the locked state. A second biometric signal having a relatively lower entropy than the first biometric signal is used to maintain the computing system in the unlocked state after it has been unlocked.

It is thus a feature of at least one embodiment of the invention to combine biometric sensors to allow leveraging variations in entropy, intrusiveness, and availability.

The first biometric signal may provide active authentication requiring conscious steps by the user at a predetermined authentication event and wherein the second biometric signal provides passive authentication without conscious effort by the user at a predetermined authentication event.

It is thus a feature of at least one embodiment of the invention to more closely approach continuous authentication through the use of passive biometric sensors generally offering lower levels of entropy and better availability.

The first biometric signal may be an anthropometric biometric signal and the second biometric signal is a behavioral biometric signal. Alternatively, or in addition, the first biometric signal may be produced by biometric sensors selected from the group of: iris sensors, fingerprint sensors, and face sensors, and the second biometric signal may be produced by biometric sensors selected from the group of gate sensors, speech sensors, typing pattern sensors, and location sensors.

It is thus a feature of at least one embodiment of the present invention to provide a system adaptable to a wide variety of biometric sensing elements.

The first and second biometric signals may be given weights related to entropy of the respective biometric signals and the weighted biometric signals may be combined to determine a current entropy value defining whether the computing system is in the locked or unlocked state.

It is thus a feature of at least one embodiment of the invention to recognize the differences in entropy of different biometric sensing technologies and to permit intelligent combination of those signals according to entropy.

The current entropy value (representing a combination of entropy signals from different biometric sensors) may increase at each authentication event according to the weights assigned to the first and second biometric signals received during at least one authentication event and may decrease subsequently as a function of time after the authentication event so that high-entropy biometric signals preserve a high-entropy value for longer than low-entropy biometric signals.

It is thus a feature of at least one embodiment of the invention to recognize differences in entropy not only with respect to the states of locking and unlocking of the computing device but also with respect to the duration between authentication events that may occur. By providing an entropy signal that increases and decreases over time, a wide variety of different biometric signal sources can be accommodated and combined in an evolving manner.

The second biometric signal may be produced from a combination of at least two different biometric sensors each producing a sensor signal assigned to a weight related to entropy of the respective sensor signal, and the weighted biometric signals may be combined to determine a current entropy value defining whether the computer system is in the locked or unlocked state.

It is thus a feature of at least one embodiment of the invention to provide a way of blending biometric signals to change a composite entropy or availability.

The unlocked state may include a first and second unlocked level associated with different access to memory regions of the computing system, and the second biometric signal may determine whether the computing system is in the first or second unlocked level.

It is thus a feature of at least one embodiment of the invention to provide more nuanced unlocking of the device based on an evolving assessment of entropy.

The first and second biometric signal may be produced from at least a first and second different biometric sensor each producing a sensor signal, and the secure computing system may further include a machine-learning processor receiving the sensor signals and mapping the sensor signals to a common machine-learning space having points identifiable by a predetermined vector representation, and a fuzzy extractor receiving the machine-learning vectors describing the points of the common machine-learning space according to the predetermined vector representation and mapping them to corresponding key strings such that different machine-learning vectors map to a same key string when the different machine-learning vectors have a predefined closeness in the machine-learning space and are combined with a corresponding helper string. A comparator compares the key strings to stored key strings to unlock the secure computing system when there is a match between a key string and a stored key string indicating an authorized user.

It is thus a feature of at least one embodiment of the invention to provide a computationally efficient way of combining multiple streams of biometric information. The machine-learning space provides a common representation allowing simpler fuzzy extraction and a combination of disparate measures.

The machine-learning processor may be trained to minimize at least one of contrast loss and triplet loss in generating the machine-learning vectors.

It is thus a feature of at least one embodiment of the invention to preserve the distinguishing characteristics of the biometric information as it is mapped by the machine-learning system.

The machine-learning vectors may be vectors of floating-point numbers.

It is thus a feature of at least one embodiment of the invention to provide a representation that is computationally tractable for fuzzy extraction.

The secure computing system may include set of different biometric sensors producing data for the first and second biometric signals measuring different distinguishing physical characteristics of an authorized user, and the machine-learning processor may use a different set of learning weights for data of each different biometric signal to produce different machine-learning vectors operated on by the same fuzzy extractor to provide different helper strings, and wherein the comparator compares the different helper strings to corresponding different stored key values for each different biometric sensor.

It is thus a feature of at least one embodiment of the invention to accommodate differences in biometric data types through machine-learning weights that can be readily developed for each sensor type for a wide variety of different sensor types.

These particular objects and advantages may apply to only some embodiments falling within the claims and thus do not define the scope of the invention.

DETAILED DESCRIPTION OF THE PREFERRED EMBODIMENT

Figure 1:
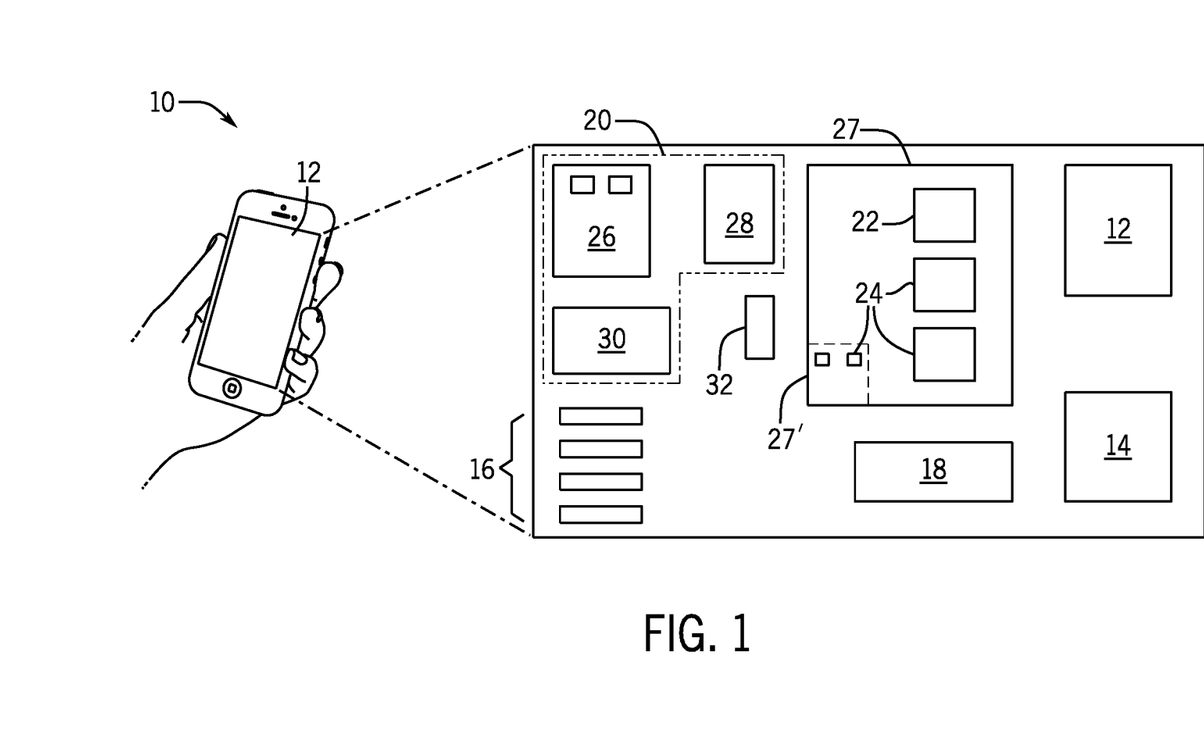
FIG. 1 is a perspective view of a secure computing device implementing the present invention with an expanded block diagram of the principal hardware components of the computing device.

Referring now to FIG. 1, a secure computing device 10, for example, a cell phone may provide a front touchscreen 12 for outputting graphical information or accepting user commands and a radio subsystem 14 providing wireless communication with the Internet, GPS satellites, and cell phone systems. As well as the sensor implemented by the touchscreen 12, the secure computing device 10 may include many additional sensors such as cameras, structured light projectors (for depth sensing), fingerprint sensors, accelerometers, microphones, and the like, each of which may provide for biometric information to authenticate the user as will be discussed below.

The secure computing device 10 may further include a computer subsystem 20 operating on data 22 and executing programs 24 (including an operating system and application programs) held in electronic memory 27. The electronic memory 27 in turn may include random-access memory and read-only memory (firmware) accessed by a memory management unit 32 which controls access to the electronic memory 27 including a secure memory portion 27', for example, holding security keys used for authentication. The memory management unit 32 may operate under firmware control to limit general access to data 22 and programs 24 in a "locked state" and to allow access to data and programs 24 in an "unlocked state" depending on authentication levels as will be discussed below. Generally, the secure memory portion 27' will only be accessed by a security protocol authenticating a user of the secure computing device 10.

The computer subsystem 20 may include one or more von Neumann type processors 26 providing general computational capabilities, one or more graphical processing units (GPUs) 28 providing specialized architectures for graphics display, and one or more neural network processors 30, the latter implementing machine-learning or neural network type operations. Each of these devices may have access to the sensors 16 and to the memory 27 through an internal bus structure, not shown. Portable operation is provided by battery cells 18 and an internal power supply (not shown) providing power to each of the above described elements. A speaker (not shown) includes the functionality required for a cell phone operation.

Secured computing devices 10 of this type are generally known in the art and this description is provided as context for the following explanation of the invention. The invention should not be considered limited to this particular hardware configuration but would be generally applicable to similar devices and structures.

Figure 2:
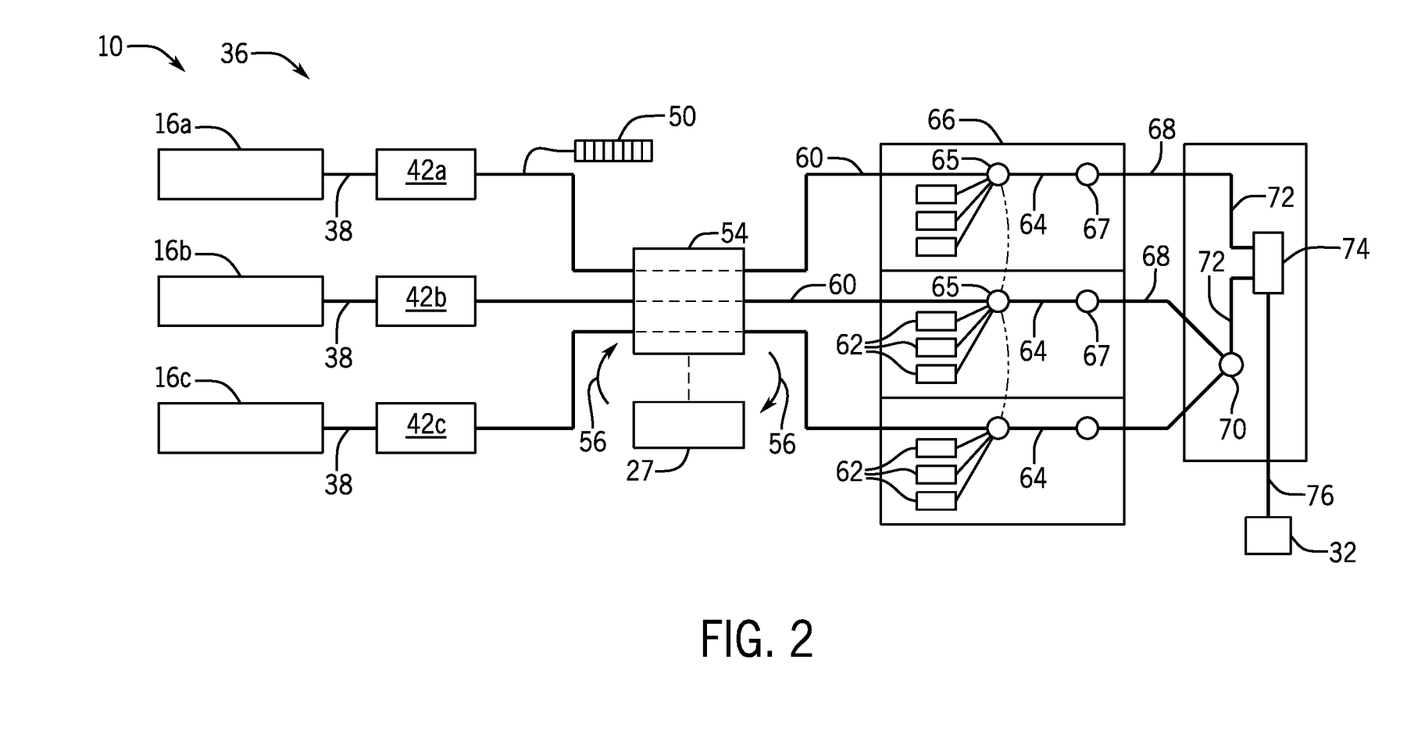
FIG. 2 is a signal-flow diagram showing the processing of sensors data used for biometric security.

Referring now to FIG. 2, the secure computing device 10 may implement a security chain 36 providing a security protocol controlling access to the memory 27 in the locked and unlocked states. During operation, the security chain 36 may receive biometric data 38 from multiple sensors 16a-16c (only three shown for clarity) as generally discussed above for the purpose of authenticating a user. Desirably the sensors 16 will include both active sensors such as fingerprint scanners and face recognition systems requiring conscious effort by the user as well as passive sensors such as accelerometers and processed microphone signals performing gait analysis, location analysis, or speech analysis operating in the background without conscious effort by the user. As noted above, sensors 16 should be broadly construed to include not only dedicated biometric sensors (such as a fingerprint reader), but also general-purpose sensors in the secure computing device 10 that may be used for biometric measurements such as cameras, microphones, and even the touchscreen 12 which may be used to analyze the user's keystrokes to identify features characteristic of an authenticated user. The sensors 16 ideally may include both anthropometric sensors measuring physical aspects of the user (such as iris characteristics, facial shape, fingerprints) or behavioral sensors such as those which measure the user's gait, speech patterns, typing patterns, and the like.

Figure 3:
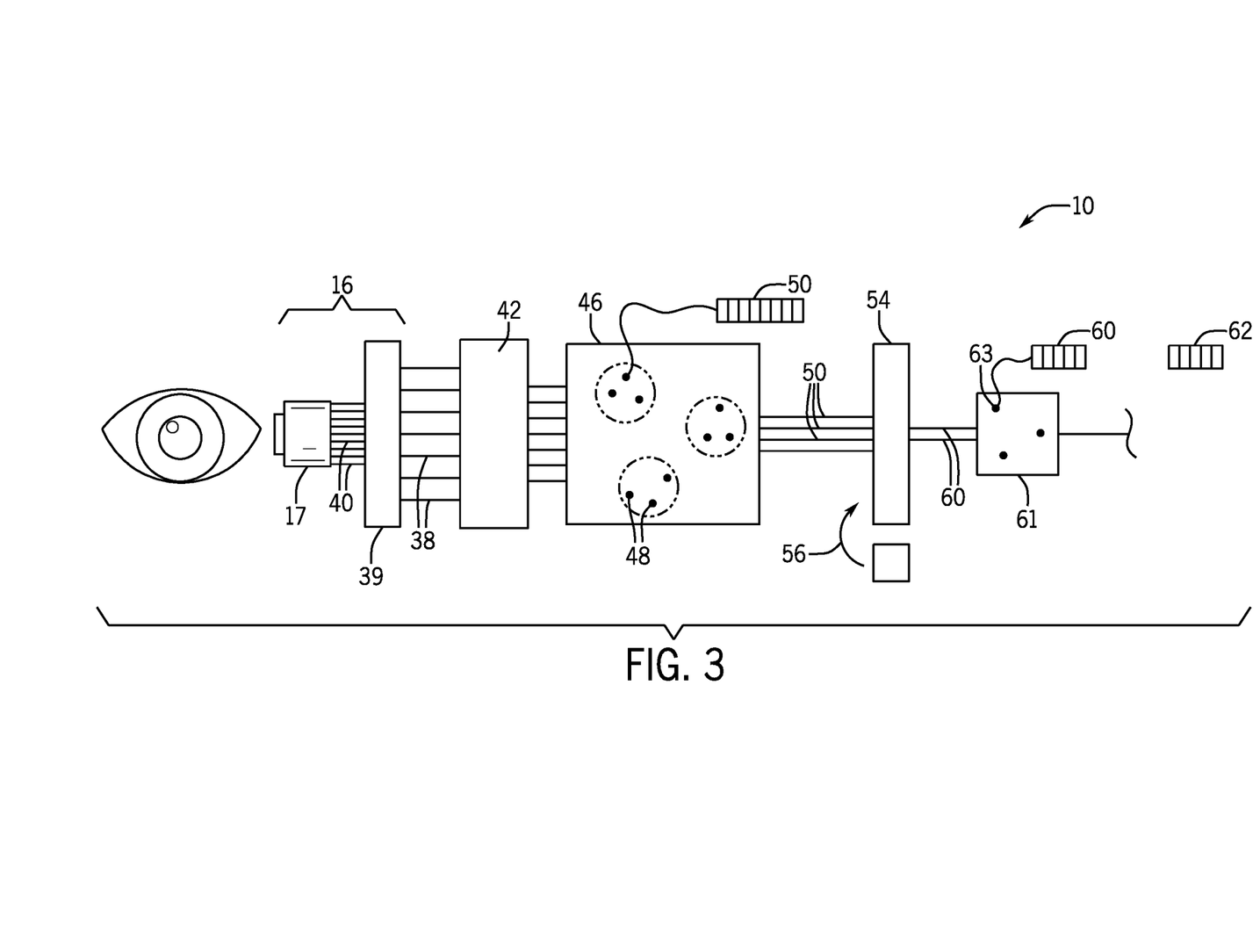
FIG. 3 is a signal-flow diagram showing transformation of signals from a sensor to a helper string per the present invention.

Referring also to FIG. 3, each sensor 16 will generally include sensor hardware 17 producing raw sensor data (for example, a microphone producing audio data) and may optionally include sensor logic 39 to receive the sensor data 40 and to process it to produce biometric data 38. In many cases, the sensor logic 39 will be implemented by a processor 26, for example, performing a Fourier transform on speech input to identify particular formant frequencies or the like or processing camera input to identify points for face identification measurement. The construction of such biometric sensors 16 including the sensor hardware 17, sensor logic 39, and the character of the biometric data 38 is generally understood in the art and described, for example, at Chaoming Song, Zehui Qu, Nicholas Blumm, and Albert-László Barabási, Limits of predictability in human mobility, Science, 327(5968):1018-1021, 2010; Ali Hammoud, Jacques Dûchene, Hussein Abou-Ghaida, Serge Mottet, Jean-Marc Goujon, and David J Hewson, Validation of a smartphone gait analysis system, in 6th European Conference of the International Federation for Medical and Biological Engineering, pages 910-913. Springer, 2015; Francesco Bergadano, Daniele Gunetti, and Claudia Picardi, User authentication through keystroke dynamics, ACM Transactions on Information and System Security (TISSEC), 5(4): 367-397, 2002; Md Rashidul Hasan, Mustafa Jamil, MGRMS Rahman, et al. Speaker identification using mel frequency cepstral coefficients variations, 1(4), 2004; and Koichi Ito, Ayumi Morita, Takafumi Aoki, Tatsuo Higuchi, Hiroshi Nakajima, and Koji Kobayashi, A fingerprint recognition algorithm using phase-based image matching for low-quality fingerprints, in Image Processing, 2005, ICIP 2005, IEEE International Conference on Image Processing, volume 2, pages II-33. IEEE, 2005, each hereby incorporated by reference.

Biometric data 38 may be generated during predetermined authentication events (for example, login) which may be dictated by the user and the operating system program 24 executing on the secured computing device 10. These predetermined authentication events typically provide active sensing requiring that the user take a discrete action such as pressing his or her finger against the fingerprint sensor. Alternatively, the authentication events may be driven by the availability of biometric data 38, for example, when the user is walking or speaking and require no conscious effort by the user.

The invention anticipates that the biometric data 38 of the different sensors 16 will vary widely both in terms of the number of data points collected and the number of dimensions of the data points in an argument space. For this reason, for each sensor 16, the biometric data 38 is then provided to a machine-learning engine 42a-42c that has been specially trained to map the biometric data 38 to a common machine-learning space 46. These machine-learning engines 42 may be implemented by specialized hardware, for example, the neural network processor 30 programed with different learning weights or may employ separate trained hardware networks. Each machine-learning engine 42 maps a different type of the biometric data 38 from the sensor logic 39 of each authentication event into a single point 48 in the common machine-learning space 46. This point will be describable by a common vector 50, for example, having a predefined length (being the dimensions of the common machine-learning space 46) and resolution (e.g., floating-point). The intent of the machine-learning engines 42 is to map the varied biometric data 38 to a common framework allowing it to be more easily processed by fuzzy extraction and more easily combined and compared.

The machine-learning engines 42 are characterized by a set of neural weights obtained by training using a training set specific to the particular sensor 16. For example, the training set for a fingerprint scanner sensor 16 will consist of biometric data for multiple fingerprints of multiple individuals each identified to a particular one of the multiple individuals. An objective function used in the training of the machine-learning engine 42 is selected to cluster the points 48 for a given individual in the machine-learning space 46 and increase the separation between points 48 for different individuals. Suitable objective functions include measurements of contrastive loss or triplet loss as is understood in the art although the invention contemplates the use of other ranking losses that minimize the distance between points for the same individual (positive pairs) and maximize the difference between data 22 for different individuals (negative pairs). The machine learning produces a set of weights that may be stored as data and then be provided to the neural network processor 30 as part of the security chain 36.

Referring still to FIGS. 2 and 3, outputs from each machine-learning engine 42 associated with each sensor 16 are then provided to a common fuzzy extractor 54 which may be designed to operate with the common vector 50 of the common machine-learning space 46. The fuzzy extractor 54 may therefore provide the same processing of each vector 50 either with a single hardware element (such as processors 26) sequentially or using parallel computations with multiple hardware elements. Fuzzy extraction suitable for use with the present invention is described, for example, at Yevgeniy Dodis, Rafail Ostrovsky, Leonid Reyzin, and Adam Smith, Fuzzy extractors: How to generate strong keys from biometrics and other noisy data, SIAM Journal on Computing, 38(1): 97-139, 2008, hereby incorporated by reference.

Generally, the fuzzy extraction provides a compression of the machine-learning space 46 tending to cluster the multiple points 48 in the machine-learning space 46 to a single point 63 in a fuzzy extraction space 61. This compression reduces the effect of noise in the biometric data 38 such as would otherwise create multiple points for the same individual. Fuzzy extraction provides a slight loss in entropy (security) of the data but the amount of loss may be minimized by the pre-clustering of the machine-learning engines 42 which may operate with reduced compression.

Each point 63 output by the fuzzy extractor 54 may be represented by a key string 60 which is produced together with a helper string 56 during a commissioning process. The key string 60 and the helper string 56 may be stored in secure memory 27. Significantly, however, each key string 60 and helper string 56 effectively "encrypt" the raw sensor data 40 and the biometric data 38 making it computationally difficult to deduce authenticating sensor data 40 or biometric data 38 from either the resultant key string 60 or helper string 56. As a result, a corresponding reference key string 62, to which the key strings 60 will be compared for the purpose of authentication (held in the secure memory portion 27') will not enable ready spoofing of the sensor 16 if revealed. For example, the key string 60 and reference key string 62 generated by a fingerprint reader will not permit reconstruction of the fingerprint that was read such as might be used to create a simulated finger for authenticating the secure computational device 10. This can be compared to the case where a fingerprint acquired by a fingerprint sensor 16 is compared directly to a fingerprint template which, if revealed, would allow ready construction of a simulated finger. Accordingly, it should be understood that the key strings 60 need not be stored in secure memory portions 27' to provide security to the underlying biometric data, a substantial advantage over a template system.

Referring again to FIG. 2, during an authentication process, the common vectors 50 are combined with corresponding helper strings 56 by the fuzzy extractor 54 to generate key strings 60. The key strings 60 are then provided to a match analyzer 66, for example, also implemented by the processors 26. The match analyzer 66 compares, at a comparator 65 for each sensor 16, the key string 60 generated during the authentication event by that sensor 16 to a set of authorized reference key strings 62. As discussed above, the authorized reference key strings 62 and helper strings 56 will have been previously generated and enrolled by the user during an authentication commissioning process. These key reference strings 62 thus characterize authorized individuals for the particular biometric sensor 16.

The comparison process, which is conducted individually for each biometric sensor 16, produces a separate match value 64 for each sensor 16 which may be a binary state (match or not) or a match weighting value indicating a degree of matching (for example, the Euclidean distance between the key string 60 and the closest reference key string 62). The match analyzer 66 may also provide for cross communication between comparators 65 requiring that the same individual be represented by contemporaneously identified reference key strings 62. The match values 64 generally indicate a degree of confidence in the match.

Generally, the match values 64 associated with different biometric sensors 16 will reflect different underlying entropies of the data of the sensors 16 and thus will each have a different significance with respect to security. In addition, given sensors, for example, one used for face recognition, may provide both high and low entropy signals, for example, if operated in an active and passive mode. These significances may be incorporated into the match values 64 by means of weights 67 applied to the match values 64 to produce effective entropy inputs 68. In one embodiment, the weights 67 may be proportional to the nominal entropies for the different sensors 16 calculated by various researchers. Generally, the weighting may be accomplished either by a scaling of the value of match values 64 or by changing the frequency of the sampling of the sensor 16 or the generation of key strings 60.

As weighted, the entropy inputs 68 may be readily combined, for example, by summing blocks 70 and/or by creating a composite entropy value that will be described below. The resulting entropy authentication signals 72 may then be provided to a locked logic module 74 that may determine whether output a locked or unlocked signal 76, the latter locking or unlocking memory using memory management unit 32 or similar mechanism.

Figure 4:
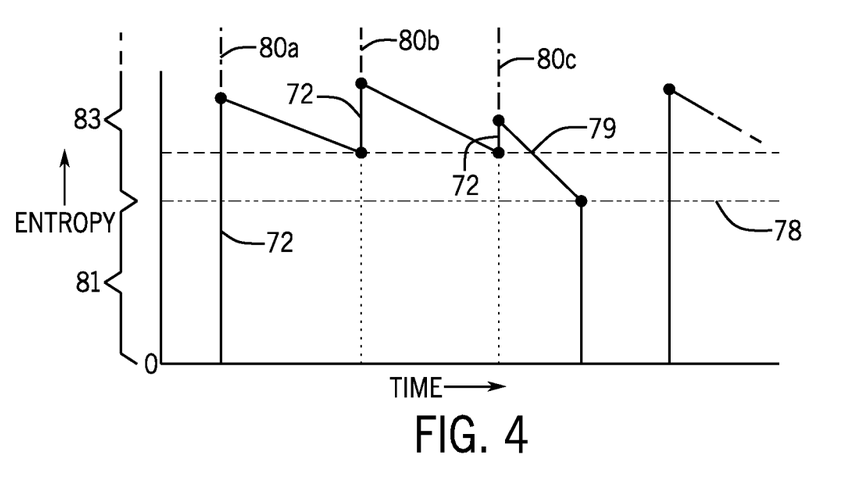
FIG. 4 is a plot of entropy versus time showing the control of locked and unlocked states for the device of FIG. 1.

Referring now to FIG. 4, in one embodiment, the locked logic module 74 may generate a composite entropy value 79 that evolves over time as influenced by the receipt of entropy authentication event signals 72. The entropy value 79 may determine whether the secure computing device 10 is in the locked state 81 (below a threshold 78) or at various levels 83 of unlock allowing access to increasingly sensitive data 22 and programs 24 (shown in FIG. 1). The arrival of a given authentication event signal 72 at an authentication event time 80, increases the composite entropy value 79 by that weighted entropy value of the authentication event signal 72. In this system, signals of higher weighted entropy provide a greater increase in the entropy value 79. The locked logic module 74 imposes a slow decay on the entropy value 79 in between the receipt of authentication event signals 72 reflecting the effective security decay of authentication information of a mobile device which may be subject to loss of custody.

In a typical use case, a high entropy sensor 16 such as a fingerprint sensor will produce an authentication event signal 72 at authentication event time 80$a$ sufficient to raise the entropy value 79 from zero to above the threshold 78 allowing an immediate unlocking of the device 10. At subsequent authentication event times 80$b$ and 80$c$ a lower-valued authentication event signal 72 will be received sufficient to maintain the entropy value 79 above the threshold 78 and to provide a degree of continuous authentication, for example, using gait analysis, location and movement, speech analysis, low-quality face recognition, and text typing patterns. When the entropy value 79 drops below the threshold 78 it may be zeroed to ensure occasional high-entropy authentication and other sensors deactivated to provide power savings during the locked state.

Figure 5:
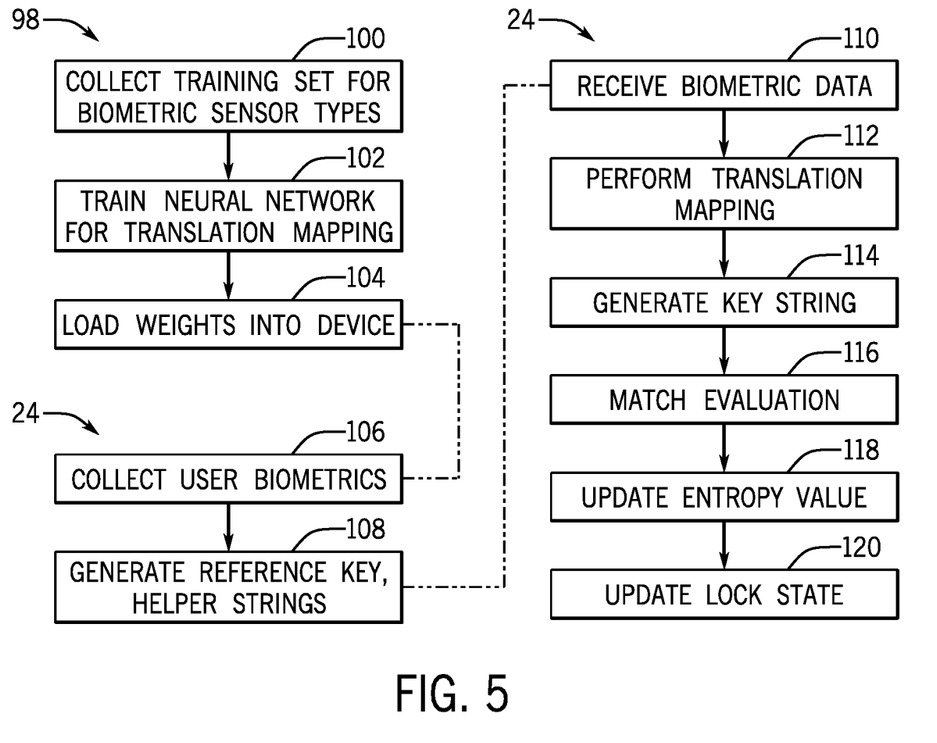
FIG. 5 is a flowchart of a program implemented by the device of FIG. 1 to implement the signal-flow of FIGS. 1 and 3.

Referring now to FIGS. 1, 3, and 5, at a time of the design of the secure computing device 10 using separate computer hardware (not shown), a program 98 may be executed to train the machine-learning engines 42 for each biometric sensor 16. As indicated by process block 100, in this process, a training set is collected for each biometric sensor 16 and its sensor logic 39 including biometric data 38 from a wide variety of individuals linked to the individuals' identities. This training set is used at process block 102 to train the machine-learning engine 42 for each sensor 16, as discussed above, to map the biometric data 38 from the sensors 16 to the common machine-learning space 46 defined by a vector 50. As noted, the training minimizes the distance between points 48 in the common machine-learning space 46 for a given individual and increases as much as possible the distance between points for different individuals.

The resulting weights are then loaded into firmware of the secure computing device 10 as indicated by process block 104. The vector 50 is predefined according to a single fuzzy extractor developed to handle these vectors 50 regardless of the sensor 16.

Referring still to FIG. 5 as well as FIGS. 1, 3 and 4, the next steps may be implemented by the programs 24 in the secure computing device 10, for example, using a single processor, or efficiently allocated between processors 26 and the neural network processor 30 and GPU 28, generally with the machine-learning model preferably executed by the neural network processor 30.

As indicated by process block 106, during a commissioning process, the user of the secure computing device 10 may then "train" the secure computing device 10 to his or her biometrics by collecting sample biometric data 38. This sample biometric data 38 is processed as discussed above with respect to the security chain 36 to produce corresponding reference key strings 62 and helper strings 56 per process block 108 that can be stored in secure memory 27'.

During use of the secure computing device 10, as indicated by process block 110, at various authentication event times 80 (shown in FIG. 4) new biometric data 38 will be received, for example, during a login event or periodically as described above. At process block 112, this data is processed by the machine-learning engine 42 to produce the vectors 50 of the common machine-learning space 46 which are then received by the fuzzy extractor 54 together with the appropriate helper string 56 as indicated by process block 114 to produce a key string 60. This key string 60 is then matched against stored reference key strings 62 described above in secure memory 27' as indicated by process block 116. According to the match between key string 60 and the reference key string 62, the entropy value 79 is updated per process block 118 to assess the locked state per process block 120.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A secure computing system comprising:
   a set of biometric sensors providing different biometric signals discriminating between different users of the computing system,
   the biometric signals providing different levels of entropy related to security, wherein a first and second biometric signal are produced from at least a first and second different biometric sensor each producing a different sensor signal measuring different distinguishing physical characteristics of an authorized user and further including:
   a machine-learning processor receiving the sensor signals and mapping the sensor signals to a common machine-learning space having points identifiable by a predetermined vector representation;
   a fuzzy extractor receiving the machine-learning vectors describing the points of the common machine-learning space according to the predetermined vector representation and mapping them to corresponding key strings such that different machine-learning vectors map to a same key string when the different machine-learning vectors have a predefined closeness in the machine-learning space and are combined with a corresponding helper string; and
   a comparator comparing the key strings to stored key strings to unlock the secure computing system when there is a match between a key string and the stored key strings indicating an authorized user; and wherein the machine-learning processor uses a different set of learning weights for data of each different biometric signal to produce different machine-learning vectors operated on by the fuzzy extractor to provide different key strings and wherein the comparator uses the different key strings corresponding to different stored key strings for each different biometric sensor.

2. The secure computing system of claim 1 wherein the first biometric signal provides active authentication requiring conscious steps by the user at a predetermined authentication event and wherein the second biometric signal provides passive authentication without conscious effort by the user at a predetermined authentication event.

3. The secure computing system of claim 2 wherein the first biometric signal is an anthropometric biometric signal and the second biometric signal is a behavioral biometric signal.

4. The secure computing system of claim 1 wherein the first biometric signal is produced by biometric sensors selected from the group of: iris sensors, fingerprint sensors, and face sensors and the second biometric signal is produced by biometric sensors selected from the group of: gait sensors, speech sensors, typing pattern sensors, and location sensors.

5. The secure computing system of claim 1 wherein the first and second biometric signals are given weights related to entropy of the respective biometric signals and wherein the weighted biometric signals are combined to determine a current entropy value defining whether the computing system is in a locked or unlocked state.

6. The secure computing system of claim 5 wherein the current entropy value increases according to the respective weights of the first and second biometric signal received during at least one authentication event and wherein a first biometric signal having a higher weighted entropy than a second biometric signal provides a greater increase in current entropy value and wherein the current entropy value decreases as a function of time after at least one authentication event so that an authentication event of the first biometric signal maintains the current entropy value above a predetermined threshold for longer than an authentication event of the second biometric signal.

7. The secure computing system of claim 1 wherein the second biometric signal is produced from a combination of at least two different biometric sensors each producing a sensor signal assigned to a weight related to the entropy of the respective sensor signal, and the weighted biometric signals are combined to determine a current entropy value defining whether the secure computing system is in the locked or unlocked state.

8. The secure computing system of claim 1 wherein the unlocked state includes a first and second unlocked level associated with different access to memory regions of the computing system and wherein the second biometric signal determines whether the computing system is in the first or second unlocked level.

9. The secure computing system of claim 1 wherein the machine-learning processor is trained to minimize at least one of contrast of loss and triplet loss in generating the machine-learning vectors.

10. The secure computing system of claim 1 wherein the machine-learning vectors are vectors of floating-point numbers.

* * * * *